United States Patent
Higgs et al.

(10) Patent No.: US 8,064,670 B2
(45) Date of Patent: Nov. 22, 2011

(54) ANALYSIS OF MULTIDIMENSIONAL DATA

(75) Inventors: Brent E. Higgs, Clinton, UT (US); John S. Birbeck, Syracuse, UT (US); Cliff E. Frieler, Farmington Hills, MI (US); Robert M. Cothren, Fairfax Station, VA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1850 days.

(21) Appl. No.: 10/952,648

(22) Filed: Sep. 29, 2004

(65) Prior Publication Data

US 2006/0072802 A1    Apr. 6, 2006

(51) Int. Cl.
G06K 9/00    (2006.01)

(52) U.S. Cl. ........ 382/131; 382/190; 382/194; 345/420; 345/421

(58) Field of Classification Search .......... None
See application file for complete search history.

(56) References Cited

U.S. PATENT DOCUMENTS

| | | | |
|---|---|---|---|
| 5,274,759 A * | 12/1993 | Yoshioka | 600/440 |
| 5,568,811 A | 10/1996 | Olstad | |
| 5,871,019 A | 2/1999 | Belohlavek | |
| 6,106,466 A | 8/2000 | Sheehan et al. | |
| 6,251,072 B1 | 6/2001 | Ladak et al. | |
| 6,295,464 B1 | 9/2001 | Metaxas | |
| 6,334,847 B1 | 1/2002 | Fenster et al. | |
| 6,385,332 B1 | 5/2002 | Zahalka et al. | |
| 6,577,752 B2 | 6/2003 | Armato, III et al. | |
| 6,674,449 B1 * | 1/2004 | Banks et al. | 715/740 |
| 6,982,710 B2 * | 1/2006 | Salomie | 345/420 |
| 2002/0102023 A1 * | 8/2002 | Yamauchi | 382/199 |
| 2002/0172407 A1 | 11/2002 | O'Donnell et al. | |
| 2003/0038802 A1 | 2/2003 | Johnson et al. | |
| 2003/0053667 A1 | 3/2003 | Paragios et al. | |
| 2003/0069494 A1 | 4/2003 | Jolly | |
| 2004/0236424 A1 * | 11/2004 | Berez et al. | 623/14.12 |
| 2005/0046629 A1 * | 3/2005 | Jeong et al. | 345/473 |

OTHER PUBLICATIONS

Medina et al., "Automatic Initialization for a Snakes-Based Cardiac Contour Extraction", Jul. 23-28, 2000, vol. 3, p. 1625.*
Jiang et al., "A physical based model for the registration of a 2D image sequence", May 7-10, 1996, vol. 4, pp. 2196-2197.*

* cited by examiner

*Primary Examiner* — John Lee
(74) *Attorney, Agent, or Firm* — Tarolli, Sundheim, Covell & Tummino LLP

(57) ABSTRACT

Systems and methods are provided for analyzing a series of images. A contour initializer establishes a plurality of initial contours from respective images within the series of images. A model initializer interconnects the plurality of initial contours into a surface model. A model refiner refines the plurality of initial contours by manipulating the surface model.

20 Claims, 7 Drawing Sheets

ANALYSIS OF MULTIDIMENSIONAL DATA

TECHNICAL FIELD

The present invention relates generally to data analysis, and more specifically to the analysis of multidimensional data.

BACKGROUND OF THE INVENTION

Modern imaging techniques, such as positron emission tomography (PET), allow the imaging of the interior of a target object without physically penetrating the surface of the target. Common non-invasive imaging techniques include X-ray tomography, nuclear magnetic resonance imaging, ultrasound, and positron emission tomography. These techniques are used extensively in the medical field. By allowing indirect observation of the interior of the human body, these imaging techniques give medical professionals increased diagnostic information without the accompanying risk of conventional exploratory techniques.

The use of medical imaging in the diagnosis of cardiovascular disorders has assumed special prominence over the last decade. Heart disease presently accounts for nearly half of all deaths in developed nations. The detection of anomalous cardiac function in a timely and efficient manner is critical in diagnosing and treating heart disease. As the average age of populations within developed nations continues to increase, early diagnosis of heart disease will become increasingly important.

A common technique for diagnosing abnormalities in the human heart is echocardiography. Echocardiography allows a medical professional to view a functioning heart and evaluate any anomalies in the structure or function of the heart in real time. Echocardiograms have been used successfully in the evaluation of cardiac function, the diagnosis of mitral-value prolapse, the evaluation of aortic and pulmonary values, and the diagnosis of congenital heart disease. Advances in ultrasound imaging have greatly increased the accuracy and definition of echocardiogram images, making it possible to perform increasingly accurate quantitative evaluations of the structure and function of the heart.

Most evaluation of echocardiograph results is performed qualitatively from a human review of the images, but valuable data can be obtained through quantitative assessment as well. Currently, a quantitative evaluation of the results of an echocardiogram requires an operator to manually outline the visible structures within a series of images. Parameters of interest can then be calculated from the outlined contours and the regions they enclose. This process is both time-consuming and subjective. As a result, it is difficult to obtain accurate and reproducible results for cardiac measurements in a reasonable period of time. This problem is exacerbated by an increasing volume of patients, which further decreases the time available for the evaluation of the echocardiogram images.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

In accordance with one aspect of the present invention, an image analysis system analyzes a series of images. A contour initializer establishes a plurality of initial contours from respective images within the series of images. A model initializer interconnects the plurality of initial contours into a surface model. A model refiner refines the plurality of initial contours by manipulating the surface model.

In accordance with another aspect of the present invention, a method is provided for determining an optimal contour from an image within a series of time-varying images. An initial contour estimate comprising a plurality of vertices, corresponding to features within the image, is generated. An external correction is applied to the position of a given vertex within the first contour model according to the relative position of the vertex and at least one feature associated with the image. An intercontour correction is applied to the position of the given vertex within the first contour model according to the relative position of the vertex and at least one vertex associated with a second contour model corresponding to a second image from the series of images. The external and intercontour corrections are applied iteratively to the given vertex until a termination condition is achieved.

A computer program product, located on a computer readable medium and operative in a data processing system, is provided for analyzing N-dimensional data, where N is an integer greater than one. A contour initializer determines a plurality of initial contours, associated with respective (N−1)-dimensional data sets. A model initializer interconnects the initial contours into an initial N-dimensional surface model. A model refiner deforms the initial surface model as to optimize the plurality of initial contours.

DETAILED DESCRIPTION OF INVENTION

The present invention relates to systems and methods for determining an optimal contour model from multidimensional data. Initial contours, comprising a plurality of vertices, are generated to correspond to respective (N−1)-dimensional data sets, where N is an integer greater than one. The contours are linked to form an N-dimensional model. A correction is applied to the position of each vertex within the model. The correction is a function of the relative position of the vertex and at least one feature associated with an associated data set, the relative position of the vertex and at least one other vertex in the model, and/or the relative position of the vertex and a priori information about the subject matter of the data set. The correction is applied iteratively to each vertex until a termination condition is achieved. The illustrated method can be applied to any of a number of data analysis applications including automated image recognition applications and medical imaging.

Figure 1:
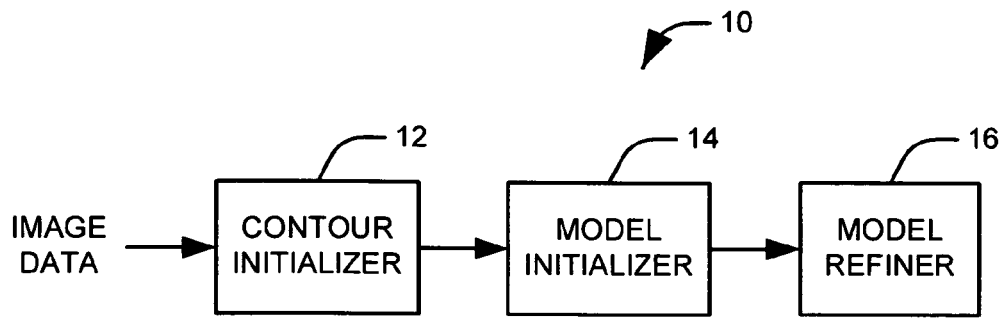
FIG. 1 illustrates a system for analyzing multidimensional data in accordance with an aspect of the invention.

FIG. 1 illustrates a system 10 for analyzing multidimensional data in accordance with an aspect of the invention. For example, the multidimensional data can represent a series of time-varying images can comprise a plurality of images or sets of images, representing a common subject matter, taken in a sequence at respective discrete times. A time-varying image can represent data having two spatial dimensions (e.g., a cross-section of a heart chamber), or data having three spatial dimensions (e.g., a 3-D contour of a heart chamber). It will be appreciated that a hyper-contour associated with data in hyper-spaces of higher dimension, not necessarily associated with physical three-dimensional objects nor with traditional imaging systems, might also be envisioned likewise without departing from the present invention.

Data, comprising a series of sets of data having N−1 dimensions, where N is an integer greater than 1, is provided to a contour initializer 12. The contour initializer 12 generates contour having N−1 dimensions for each of the data sets. The generated contour comprises a plurality of vertices. A given vertex is connected to one or more neighboring vertices within an N−1 dimensional space to form the contour. For example, the contour initializer 12 Can assign vertices to locations within an image where there is a threshold change in intensity or texture.

Once the initial contours have been generated, the data is provided to a model initializer 14. The model initializer 14 connects the plurality of initial contours across the time series at one or more corresponding vertices to form an N-dimensional surface model. Corresponding vertices on two contours can be determined according to the spatial relationships between their respective vertices. For example, the model initializer 14 can project the location of a first vertex on a first contour onto a second contour and determine the vertex that is located closest to the projection. It will be appreciated that successive contour can have differing numbers of vertices, and that a vertex can be connected to zero, one, or multiple vertices on a given neighboring contour.

Once the surface is defined, the data is provided to a model refiner 16. The model refiner 16 refines the surface model by adding, removing, and changing the location of the vertices comprising the surface according to a variety of factors. For example, a vertex can be shifted due to its relative position to one or more other vertices or according to the (N−1) dimensional data sets. In accordance with one aspect of the present invention, a priori knowledge relating to the subject matter of the data can be factored into the refinement process. The resulting surface model provides an optimal configuration of vertices for each contour, such that desired measurements can be extracted from the associated data. For example, the change over time in a cross-sectional area represented by the contours can be measured.

Figure 2:
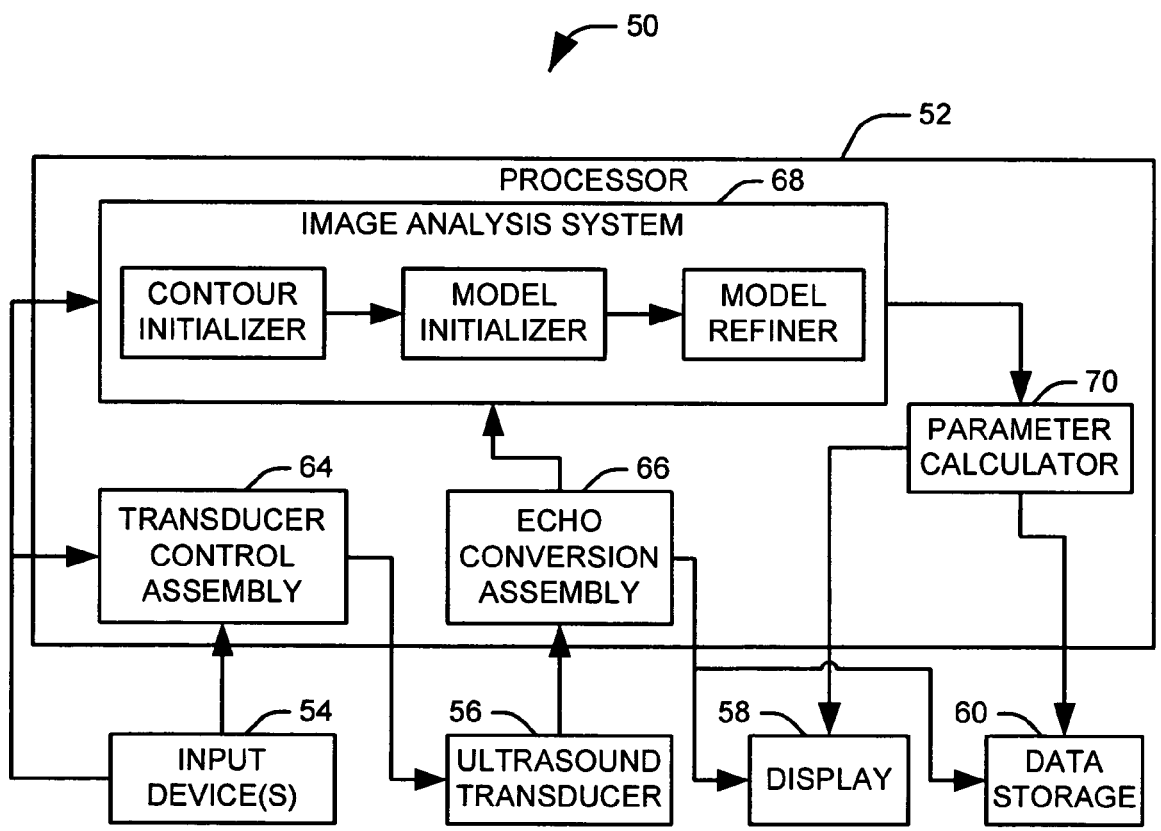
FIG. 2 illustrates an exemplary ultrasound imaging system in accordance with an aspect of the present invention.

FIG. 2 illustrates an exemplary system 50 for implementing the various aspects of the invention in the context of ultrasound imaging. The illustrated system 50 comprises a processor 52, one or more input devices 54, an ultrasound transducer 56, a display 58, and external data storage 60. The illustrated system is merely an exemplary illustration of an environment in which one or more aspect of the present invention can be implemented. Accordingly, it will be appreciated that the present invention can be utilized in ultrasound systems lacking one or more of the illustrated components, as well as in non-ultrasound imaging systems in medical and non-medical applications.

The processor 52 includes a transducer control assembly 64. The transducer control assembly 64 generates a pulse sequence to the ultrasound transducer 56. The amplitude, frequency, and duration of the pulse sequence can be determined by the transducer control assembly 64 in response to user input at the input devices 54. The determined pulse sequence is provided to the ultrasound transducer 56, which projects sound waves based on the determined pattern into a target and detects reflected wave patterns. It will be appreciated that an ultrasound imaging system produces a full-motion video output. Accordingly, the transducer 56 will detect multiple (e.g., thirty) reflected sound wave patterns every second.

The detected wave patterns are provided to an echo conversion assembly 66 within the processor 52. The echo conversion assembly 66 translates the detected wave pattern into a time series of image frames, which are provided to the display 58 as full-motion video. The image frames can also be stored within the external data storage 60. For example, the external data storage 60 can comprise a disk drive that records the image data to a floppy disk or a compact disk. The series of image frames are then provided to an image analysis system 68.

The image analysis system 68 produces respective optimal contour models for the subject matter illustrated by the image frames in accordance with an aspect of the present invention. The optimized contour models are then provided to a parameter calculator 70 that calculated values for a number of parameters of interest. For example, where the subject matter of interest is the left ventricle of a human heart, the parameter calculator 70 can determine the volume of the ventricle at various stages of a heartbeat (e.g., systolic volume and diastolic volume), the instantaneous filling rate and ejection rate of the ventricle, and an ejection fraction describing the contractility of the heart. The optimized contour models and the calculated parameters can then be provided to the display 58 and stored at the external data storage 60.

Figure 3:
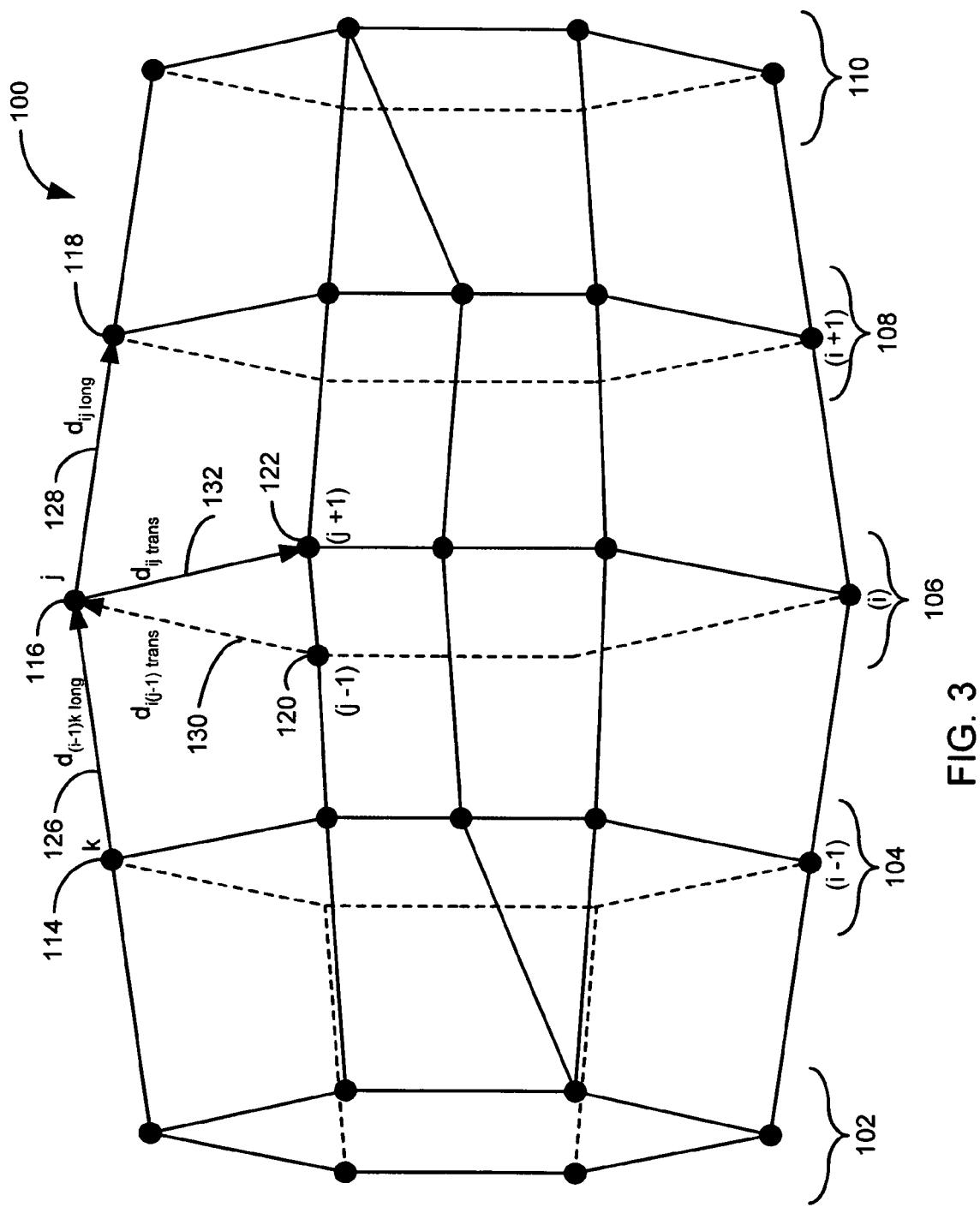
FIG. 3 illustrates an exemplary model of a three-dimensional surface in accordance with an aspect of the present invention.

FIG. 3 illustrates an exemplary model 100 of a three-dimensional surface, formed from five two-dimensional contours 102, 104, 106, 108, and 110, in accordance with an aspect of the present invention. It will be appreciated that each of the two-dimensional contours (e.g., 102) can correspond to two-dimensional data, such as image data. A given two-dimensional contour (e.g., 102) comprises a plurality of vertices (e.g., 114, 116, 118, 120, and 122). The position of a given vertex (e.g., 116) can be influenced by the position of each of a plurality of other vertices, including vertices (e.g., 120 and 122) within its associated contour (e.g., 106) and vertices (e.g., 114 and 118) on neighboring contours (e.g., 104 and 108). The connections 126, 128, 130, and 132 represent the influence between vertices neighboring contours (e.g., 104 and 108). The connections 126, 128, 130, and 132 between vertices define the three-dimensional surface depicted by the model 100.

Each connection (e.g., 126) between vertices (e.g., 114 and 116) represents an interrelationship between the vertices comprising the three-dimensional surface. The surface can be deformed by shifting the position of the vertices. The connections can be divided into transverse connections (e.g., 130 and 132) and longitudinal connections (e.g., 126 and 128). Transverse connections are defined as intracontour connections (e.g., connections between vertices on the same contour). Longitudinal connections are defined as intercontour connections (e.g., between vertices on different contours).

In a discussion of the optimization and deformation of the surface model, it is desirable to discuss the relative position of neighboring vertices in terms of displacement vectors between the vertices. It will be appreciated that the displacement vectors coincide with the connections between the vertices. Accordingly, several connections 126, 128, 130, and 132 have been illustrated as directional vectors representing the relative position of their connected vertices. Each vector is labeled according to its initiating contour, its initiating vertex, and the type of connection it represents. For example, the displacement vector representing the relative position of the vertex 114 labeled k and the vertex 116 labeled j is referred to as $d_{(i-1)k\ long}$. This nomenclature will be maintained throughout to facilitate the discussion of the various aspects of the present invention.

Figure 4:
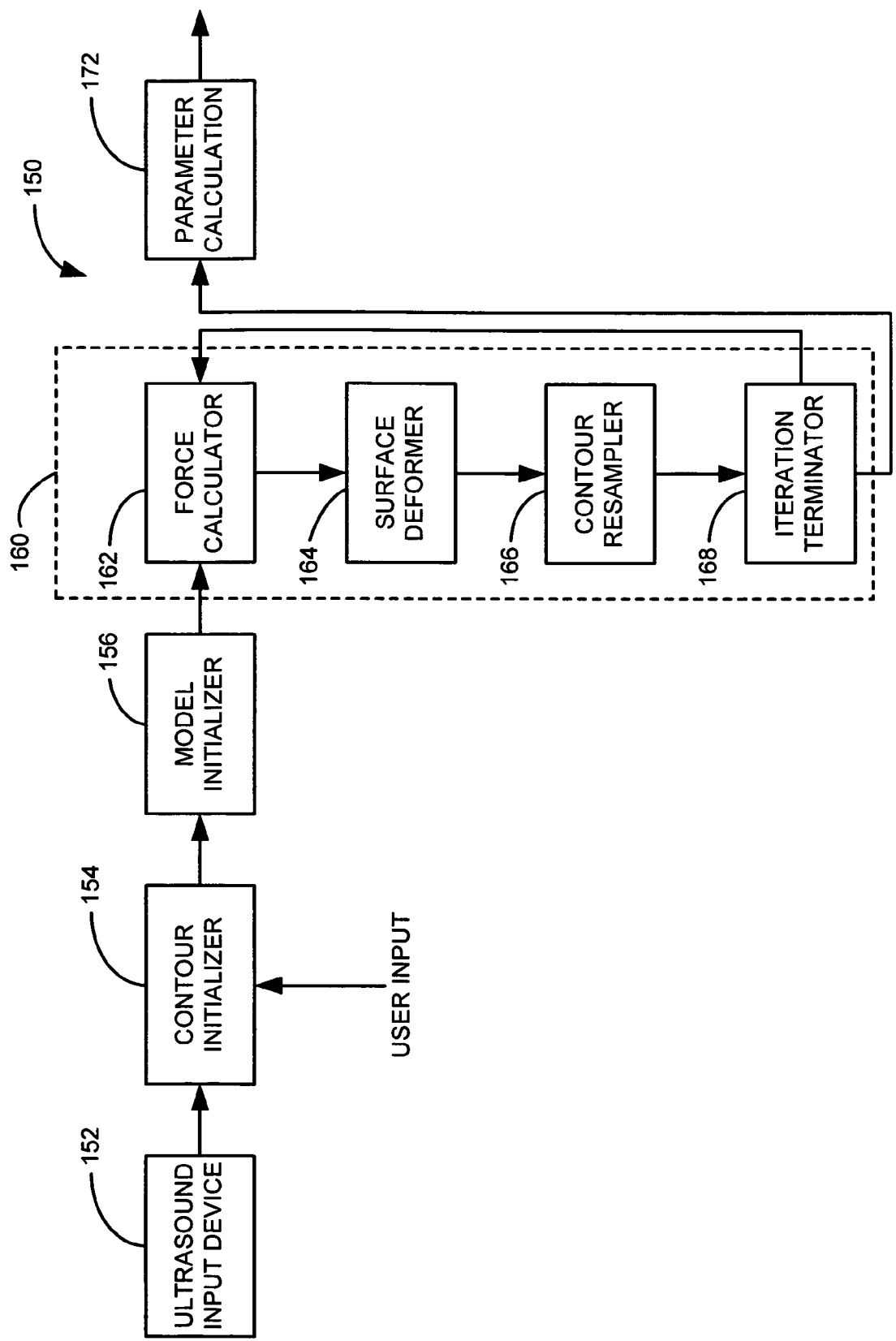
FIG. 4 illustrates an exemplary implementation of an image analysis system in accordance with an aspect of the present invention.

FIG. 4 illustrates an exemplary implementation of an image analysis system 150 in accordance with an aspect of the present invention. In the exemplary implementation, the system 150 is a software program configured to analyze a time series of two-dimensional ultrasound images representing a cross-section of the left ventricle of a human heart on a general purpose computer processor. It will be appreciated, however, that the image analysis device of the present invention can be applied to images and image sets having a smaller or larger dimensionality, to imaging sensors other than ultrasound sensors, and to other medical and non-medical imaging applications. It will be further appreciated that the illustrated system 150 can be implemented as hardware or software on an imaging machine or other specialized apparatus.

An ultrasound input device 152 produces a time series of ultrasound image frames. A given ultrasound image frame depicts a two-dimensional cross-section of the left ventricle at a particular moment in time. The interval between frames in the series can be constant or variable, depending on the application. For the purpose of the present example, a constant interval of one-thirtieth of a second is assumed. Each image depicts the left ventricular chamber of the human heart as a roughly elliptical area of interest bounded by the heart wall.

The series of image frames is passed to a contour initializer 154. The contour initializer 154 defines an initial contour around the area of interest for each image frame according to the position of the heart wall. For example, the contour can be defined according to a transition of brightness within the image signifying a boundary between the heart muscle and the ventricular chamber. The contour comprises a plurality of vertices, with each vertex being connected to its neighboring vertices to form a closed shape. The contour initializer 154 can receive input from a user to aid in the identification of the area of interest.

In accordance with one aspect of the invention, the user input can comprise the identification of several key points in one or more frames. For example, the user can select a point to either side of the mitral value annulus in three sample frames representing a cycle from end diastole, to end systole, to end diastole. The initial contour in each of the sample frames is formed as a series of half-ellipses, with the vertices defining the image being evenly spaced along the ellipse. The initial contour for each other frame is determined via linear interpolation from contours within the sample images.

In accordance with another aspect of the invention, a user can select one point within a single frame approximating the center of the area of interest. A contour is then estimated by searching the image radially in several directions to determine a transition boundary, such as a sudden change in image brightness. A vertex is placed wherever the radial search encounters a transition. The contour is then estimated by connecting the vertices with arcs and populating the arcs with further vertices. This process is repeated for each frame.

Once the initial image contours have been established, the image data and initial image contours are provided to a model initializer 156. The model initializer 156 generates an initial surface from the plurality of image contours by establishing a relationship between spatially related vertices across multiple frames. For each vertex on a given contour, the model initializer 156 determines one or more corresponding vertices on neighboring frames. Corresponding vertices for a first vertex associated with a first frame can then be determined by finding one or more vertices associated with a second frame that are closest to a projection of the first vertex onto the second frame. In an exemplary embodiment, corresponding vertices are located for each vertex in a given image in both the preceding and the subsequent frames, where both are present.

The initial model data is passed to a refinement routine 160. The refinement routine 160 deforms the established initial model to conform to the image data, while maintaining a relatively smooth surface and taking into account known a priori data about the subject matter of the images. This deformation takes place under the influence of a plurality of conceptual forces applied to vertices, with the vertices treated as point masses. By iteratively calculating the displacement induced by these forces for each vertex, the surface can be deformed into a shape that approximates the contour of the imaged matter (e.g., a cross-section of a ventricular wall) for each image. It will be appreciated that the deformed surface will not resemble the imaged matter itself, but rather approximate the change in an imaged two-dimensional contour over a period of time.

The refinement routine 160 begins at a force calculator 162. The force calculator 162 calculates a total force induced upon each vertex as a combination of several conceptual forces. These forces can include an internal force, which acts to maintain a smooth, continuous surface (e.g., constant local curvature across the surface), an external force that attracts vertices toward desired features within their respective images, an a priori force that draws the vertices toward an expected contour based on a priori information, and a damping force that acts to reduce oscillations in the location of the vertices and to force convergence to a final solution. The action of these four forces upon the vertices comprising the surface deforms the surface into a time series representation of the imaged subject. In an exemplary embodiment, the external force attracts the vertices on each frame to areas of light-dark transition. The image can be filtered or normalized to mitigate the effects of extraneous light and dark patches. A gradient can then be calculated for each pixel for both an x-direction and a y-direction. The external force is then proportional to the magnitude of the gradient and in the direction of the local peak in the gradient.

The internal forces between vertices act to reduce drastic changes in curvature between vertices and maintain a smooth, continuous surface. Each vertex is connected to two other vertices within its frame via a first transverse vector ($d_{ij\ trans}$) and a second transverse vector ($d_{i(j-1)\ trans}$). A given vertex is also connected with one or more vertices on adjacent frames via longitudinal vectors. These connections represent conceptual attractive forces between the vertices. A typical vertex that is not on an edge frame will be connected to a vertex on the preceding frame by a first longitudinal vector ($d_{(i-1)k\ long}$) and to a vertex on the subsequent frame by a second longitudinal vector ($d_{ij\ long}$. The internal force is projected into the plane of its respective contour and therefore, like the other forces, acts only to displace a vertex to a new location within its respective contour.

Several parameters can be introduced to the transverse internal force to account for contour stiffness in various positions around the contour. A nonuniform stiffness matrix can be derived from the fractional distance represented by various portions of the contour. For example, the stiffness matrix can be calculated from a statistical model of the contour of interest derived from a plurality of sample images. This allows the internal force to depart from a strictly circular model (e.g., constant curvature model) and allow for varying curvatures in portions of the contour where such curvature should be expected. A second parameter, $w_{uni}$ can also be introduced to allow adjustment in the uniformity of the stiffness of the contour A third force that can be applied to a vertex is an a priori external force. The a priori external force can be determined by taking a number of sample time series of image data. These samples can include models of both healthy and diseased hearts. A human operator can manually outline the desired contour, in this case the left ventricle wall, in each frame of the sample time series. Frames from corresponding portions of the cardiac cycle, as determined by an electrocardiogram associated with each time series, can be grouped together and aligned spatially. The probability distribution of the boundaries of the contours within a group of frames can then be calculated.

The combined probability distributions across the groups of frames forms a three-dimensional probability field in two spatial dimensions and time reflecting the probability that the boundary will be found at a particular point. The probability field is then scaled and translated to align with the three-dimension surface. The force at each point is derived from the gradient of the probability field at that point.

A final force in the force calculation is the damping force. The damping force acts to oppose the direction of movement for each vertex. The damping force is provided to force the convergence of the iterative refinement to a final solution. In the absence of a sufficient damping force, vertices within the model tend to oscillate around a stable solution.

Once the forces have been calculated, they are multiplied by respective weighting coefficients. The a priori force can be weighted such that the external force dominates, allowing the available image data to dictate the contour when sufficient data is available. In areas lacking a clear light-dark transition boundary, however, the external force will be small, and the a priori force, in unison with the internal force, will supplement the ambiguous image data to produce a reasonable approximation to the imaged subject matter. The weighted forces are summed to produce a total force, F, at each vertex, such that:

$$F = w_{ext} f_{ext} + w_{int} f_{int} + w_{prior} f_{prior} + w_{damp} f_{damp} \quad \text{Eq. 1}$$

After a force is calculated for each vertex, the model is passed to a surface deformer 164. At the surface deformer, 164, the total force at each vertex over a given discrete time interval is translated into an acceleration over that interval by dividing the magnitude of the force by a mass assigned to the vertex. In an exemplary embodiment, all of the vertices are assigned a common mass, but it will be appreciated the assigned masses of the vertices can differ. A final velocity value for the vertex can be calculated from an initial velocity (e.g., the velocity of the vertex at the end of the last deformation), the duration of the time interval, and the determined acceleration value. The movement of the vertex over the time interval is then calculated by multiplying the duration of the given time interval by an average velocity equal to the arithmetic mean of the initial velocity and the final velocity. This deformation is repeated for each vertex, with each vertex being repositioned according to the calculated displacement.

Once the model has been deformed, it is passed to a contour resampler 166. The contour resampler 166 resamples the contour of each frame to maintain a desired spacing between neighboring vertices. An operator provides a parameter, l, which represents a desired intervertex spacing. The resampling comprises two passes. In a first pass, vertices are added between any two vertices exceeding a maximum intervertex distance (e.g., 1.5 l). In a second pass, vertices are removed to maintain a minimum intervertex distance (e.g., 0.5 l). Any added vertices are assigned an initial velocity computed as a linear interpolation of its two neighboring in-frame vertices.

The resampled surface is passed to an iteration terminator 168. The iteration terminator 168 terminates the iterative refinement process when the model achieves one of one or more termination conditions. For example, the termination conditions can include the completion of a predetermined number of iterations, the passage of a given period of time, or the achievement of an average vertex displacement across the model within a single iteration that is less than a threshold value. In an exemplary implementation, the iterative loop is terminated when the average velocity of all of the vertices in the model drops below a percentage of a maximum average velocity or after a set number of iterations. It will be appreciated that other termination conditions can be utilized, depending on the application.

If a termination condition is not met, the model begins another iteration of the refinement loop 160 at the force calculator 162, where the forces on the vertices are recalculated based on their new location. If a termination condition is met, the model is accepted. The model can be utilized for qualitative assessment by a technician and/or provided and passed to a parameter calculator 172. The parameter calculator 172 calculates one or more parameters of interest from the plurality of contours comprising the model. These parameters are then output to a display or to a storage medium for evaluation by a human operator.

In an exemplary implementation, where the imaged matter is the left ventricle of a human heart, these parameters can include the end diastolic volume of the left ventricle, the end systolic volume of the left ventricle, and the ejection fraction associated with a cardiac cycle. Further, since the present invention allows the volume of the ventricle to be calculated at every image frame, automated calculation of additional parameters, such as the peak ejection rate and peak filling rates through one cardiac cycle, can be conducted in an efficient manner. These additional parameters can provide a more precise description of the function of the heart without additional operator intervention.

Figure 5:
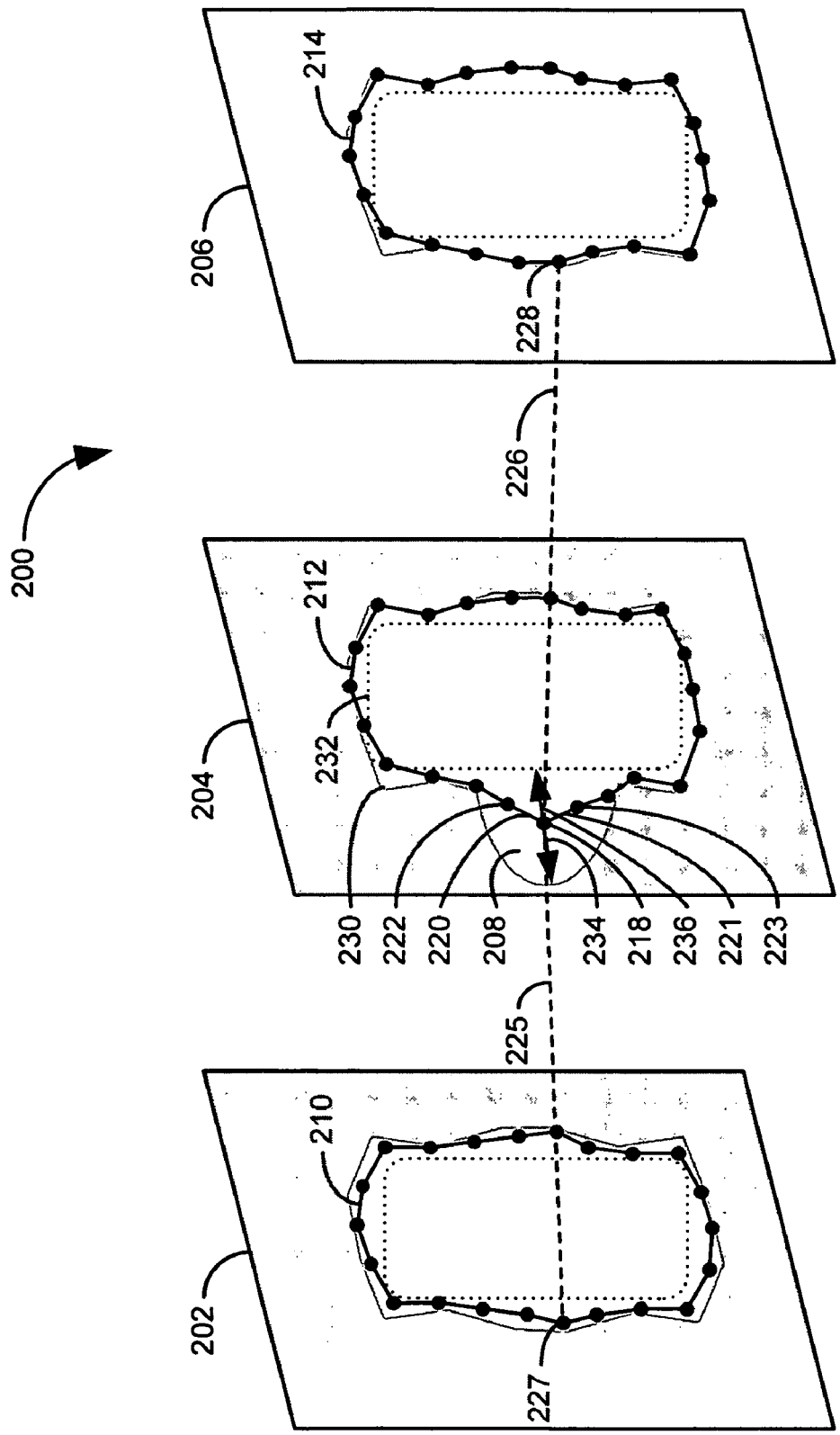
FIG. 5 illustrates an exemplary time series of image data in accordance with an aspect of the invention.

FIG. 5 illustrates an exemplary time series 200 of image data in accordance with an aspect of the invention. The illustrated time series 200 depicts a first image 202, a second image 204, and a third image 206 within the series. Each image comprises a light region, representing an area of interest, and a dark region, representing a physical boundary encapsulating the area of interest. It will be appreciated that this representation can be imperfect, due to errors during the acquisition of the images. For example, the second image 204 has a significant extension 208 of the light region of the image that can be attributed to an error in the acquisition of the image.

In accordance with one aspect of the present invention, boundaries associated with the areas of interest are modeled by respective contours 210, 212, and 214. Each contour comprises a plurality of vertices. A given vertex 218 is connected by transverse connectors 220 and 221 to two neighboring vertices 222 and 223 within the plane of its associated contour 212 and by longitudinal connectors 225 and 226 to one or more corresponding vertices 227 and 228 associated with other contours 210 and 214. The connections 220, 221, 225, and 226 between vertices represent edges on a three-dimensional surface representing the time series.

The position of the vertex 218 is a function of its relative position to each of the boundary 230 between the light region and the dark region, the vertices 222, 223, 227, and 228 to which it is connected, and an a priori boundary 232 representing the expected location of the contour. For example, the light-dark boundary 230 attracts the vertex 218 toward the exterior of the image. This attraction can be represented by a first radial force vector 234 acting to move the vertex toward the light-dark boundary 230. Similarly, the vertex 218 is attracted to the a priori boundary 232, in the direction indicated by a second radial force vector 236. The a priori boundary 232 mitigates the influence of the erroneous data represented by the extension 208 on the contour 202.

A second force governing on the migration of the vertex 218 toward the light-dark boundary 230 comes from the internal force represented by its connections 220, 221, 225, and 226 with other vertices. The transverse connections 220 and 221 represent a force that acts to retain the contour 212 at a constant curvature. The longitudinal connections 225 and 226 represent a second internal force that opposes distortion of the three-dimension surface represented by the contours 210, 212, and 214. The longitudinal force acts to maintain the longitudinal curvature of the surface. The combined internal forces restrain the vertex from migrating toward the extension 208 and distorting the contour 212 in that region.

Figure 6:
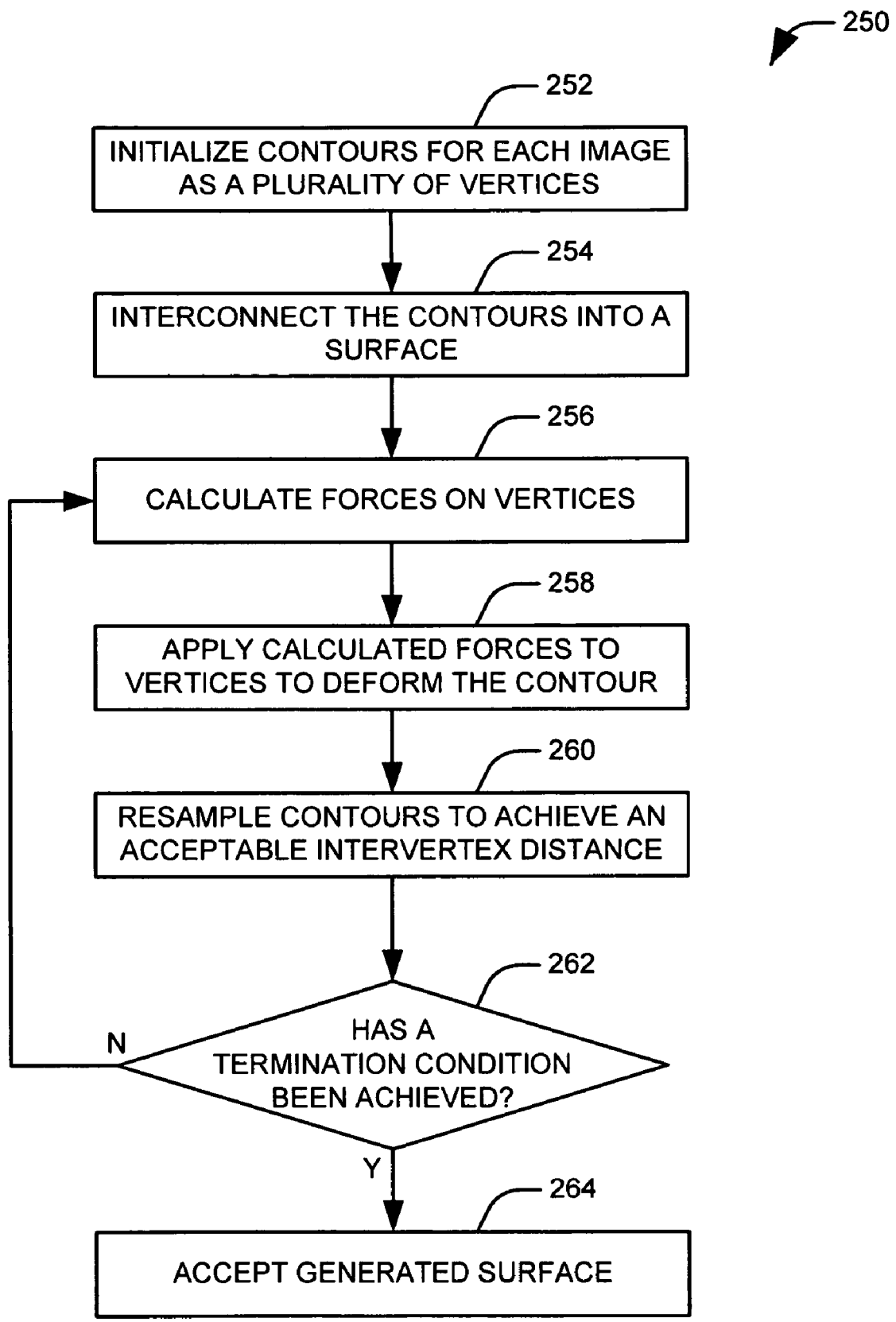
FIG. 6 illustrates a methodology for analyzing a series of time-varying images in accordance with an aspect of the invention.
Figure 7:
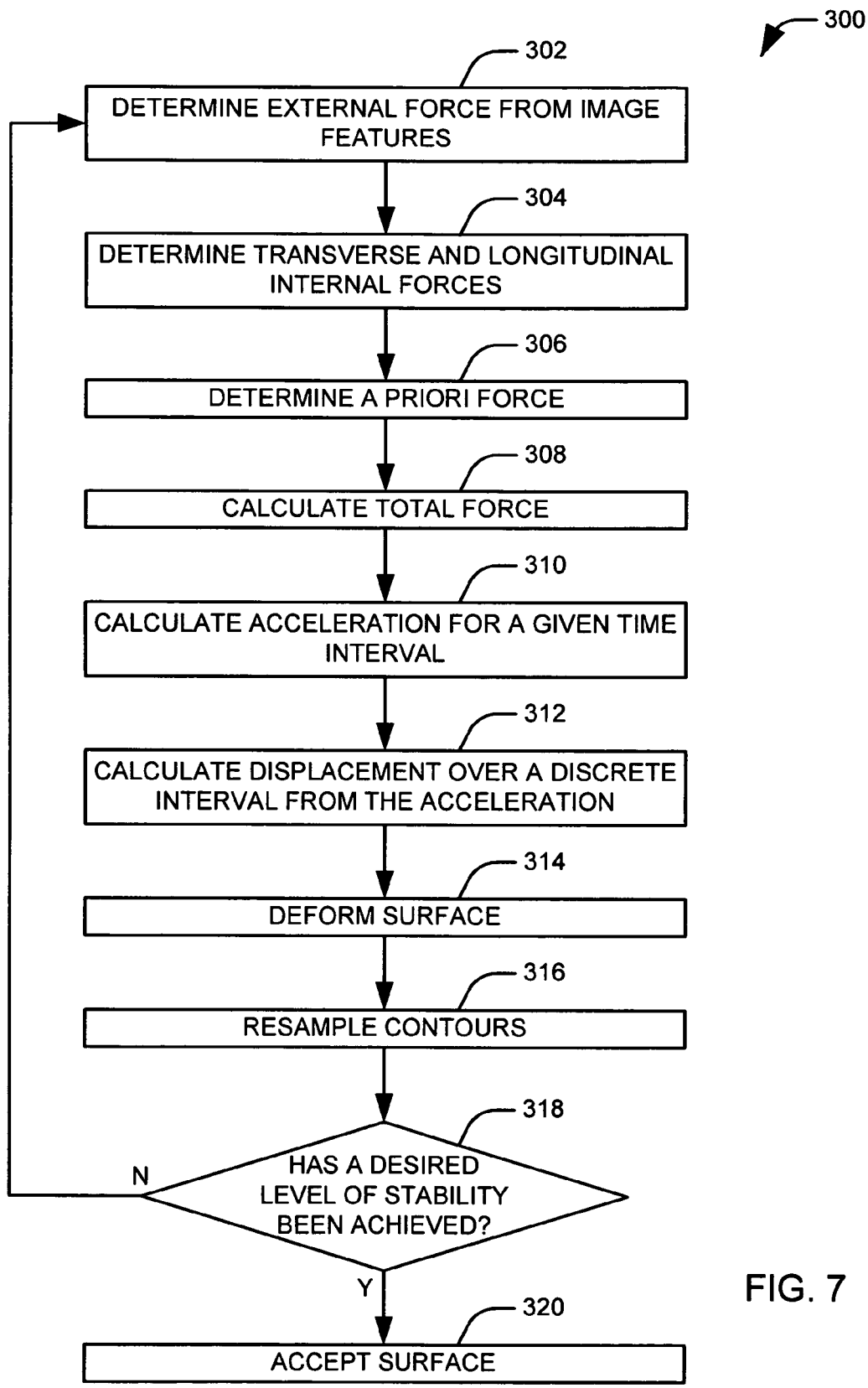
FIG. 7 illustrates an exemplary methodology for iteratively deforming a surface generated from a time series of images.

In view of the foregoing structural and functional features described above, methodologies in accordance with various aspects of the present invention will be better appreciated with reference to FIGS. 6 and 7. While, for purposes of simplicity of explanation, the methodologies of FIGS. 6 and 7 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 6 illustrates a methodology 250 for analyzing a series of time-varying images in accordance with an aspect of the invention. At 252, an N-dimensional contour is generated for each of a plurality of the time-varying images, with each generated contour comprising a plurality of vertices. It will be appreciated that N is a positive integer less than or equal to three. The contours can be generated based upon features associated with each image.

The methodology continues at 254, where a plurality of N-dimensional contours are interconnected across the time series to form a surface having the original N dimensions and a temporal dimension. Vertices on a given contour are connected to vertices associated with its neighboring contours to form the edges of the surface. The constructed model is then subjected to an optimization routine 256, 258, 260, and 262. At 256, a plurality of virtual forces are calculated for the vertices comprising the surface. For example, these forces can be determined from image features, from a priori data, or from interconnections between vertices. Forces stemming from interconnections between vertices can include transverse forces originating from connections between vertices within a given contour, and longitudinal forces that result from connections between vertices on different contours.

At 258, the calculated forces are applied to the vertices, resulting in a deformation of the surfaces. The calculated forces can be applied over a predetermined time interval to produce radial displacement of the vertices within the contour. The contours are then resampled at 260, to maintain an acceptable intervertex distance across the surface. The deformation of the surface can result in unacceptably large or small vertex spacing across the contours comprising the surface. By resampling, a reasonably even distribution of vertices can be maintained to allow for efficient manipulation of the surface and sufficient contour resolution.

Once the contours have been resampled, it is determined at 262 if the deformation of the surface has resulted in a termination condition. For example, the termination conditions can include the completion of a predetermined number of iterations of the optimization routine, the passage of a given period of time, or a mean displacement of vertices in a given iteration that is less than a threshold minimum. If a termination condition is not present, another iteration of the optimization routine is performed and the methodology returns to 256 to calculate a new set of forces for the vertices. If a termination condition is present, the methodology advances to 264, where the generated surface is accepted.

FIG. 7 illustrates an exemplary methodology 300 for iteratively deforming a surface generated from N-dimensional data as to refine the shape of a plurality of contours associated with respective N−1 dimensional data sets. It will be appreciated that while the illustrated methodology 300 focuses on the analysis of image data that it is generally extendable to other forms of multidimensional data. The surface comprises a plurality of interconnected vertices, with each vertex being associated with one of the plurality of contours. At 302, an external force is determined for each vertex. The external force represents the conformity of the contours comprising the surface to features within their respective images. For example, the external force can attract the vertices on each frame to areas of light-dark transition.

At 304, internal forces associated with each vertex are calculated. The internal forces between vertices act to oppose changes in curvature between vertices and maintain a smooth surface. Each vertex is connected to two other vertices within its contour. These connections are referred to as transverse connections. A given vertex is also connected with one or more vertices on adjacent contours. These connections are referred to as longitudinal connections. The longitudinal and transverse internal forces on a vertex act through these connections to limit the extent to which a particular vertex can be deformed away from its neighboring vertices.

The described methodology seeks to optimize the contour within its associated image. Accordingly, the internal forces can act upon a given vertex only within the plane or volume of its associated image. The transverse internal force originates from connections within this plane or volume, and is a function of the local curvature of the contour at the given vertex. The transverse internal force simply acts to oppose changes from a smooth, continuous curvature at each vertex.

The longitudinal force works in a similar manner, opposing changes in the curvature of the surface representing the time series. To ensure that each contour remains within the within the plane or volume of its associated image, however, it is necessary to project the force determined from the longitudinal connections into the plane or volume of the vertex. Thus, while the longitudinal internal force is generated according to connections between vertices on different contours, it can only operate to displace the vertex within the space associated with its contour.

At 306, a priori force is determined. The a priori force draws the vertices toward an expected contour based on known information related to the subject matter of the image series and the known characteristics of the imaging modality. The a priori force can represent a probability distribution of the contour locations in the time series derived from a group of sample frames associated with the given time. The methodology then advances to 308 where a total force is calculated from the external, internal, and a priori forces. For example, the total force can comprise a weighted sum of these three forces. The total force further includes a damping force that facilitates the convergence of the iterative process.

After a force is calculated for each vertex, the methodology advances to 310, where the force is translated into an acceleration. An acceleration for each vertex can be calculated by dividing the magnitude of the force by a mass assigned to the vertex. In an exemplary embodiment, all of the vertices are assigned a common mass, but it will be appreciated that the assigned masses of the vertices can differ. At 312, a displacement for each vertex over a discrete time interval is calculated from the acceleration. For example, a velocity term can be obtained the duration of the time interval and the determined acceleration value. The displacement of the vertex can then be obtained for each iteration from the current location and velocity of the vertex and the velocity for the next iteration can be determined from the acceleration term.

After a displacement is calculated for each vertex, the methodology advances to 314, where the surface is deformed according to the calculated displacements. Each vertex is repositioned according to the calculated displacement to create a new model of the surface. At 316, the contours are resampled to maintain a desired intervertex distance across the surface. Vertexes less than a first threshold distance from a neighboring vertex are removed, and vertexes are added between vertices separated by a distance greater than a second threshold.

Once the contours have been resampled, it is determined at 318 if the surface model has achieved a desired level of stability. For example, a model can be deemed stable when an average of the velocity term associated with the plurality of vertices in the model drops below a threshold value. If the model is not yet stable, the methodology returns to 302 to begin another iteration of the optimization routine. If the model is found to be stable, the methodology advances to 320, where the surface model is accepted.

Figure 8:
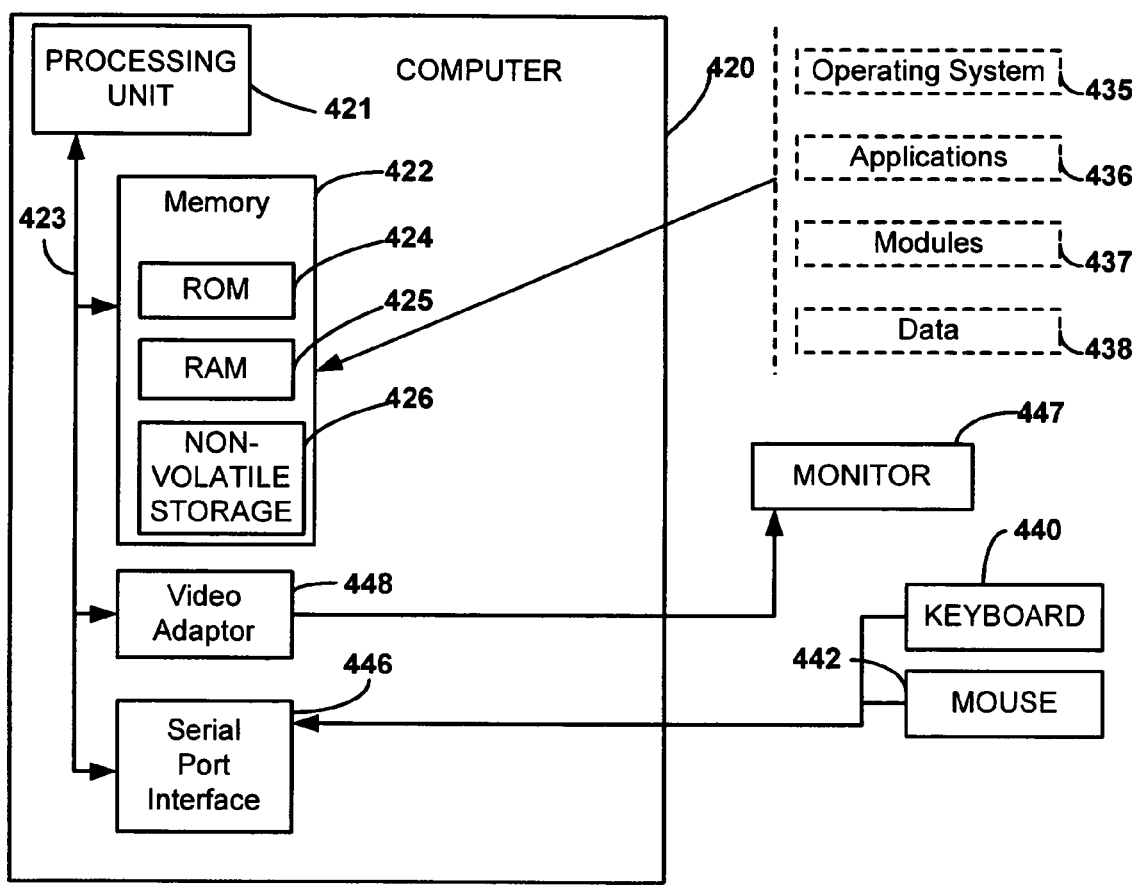
FIG. 8 illustrates a schematic block diagram of an exemplary operating environment for a system configured in accordance with the present invention.

In order to provide a context for the various aspects of the invention, FIG. 8 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. In an exemplary embodiment, the system of the present invention can be implemented as an embedded computer within an imaging device. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 8, an exemplary system for implementing the various aspects of the invention includes a conventional computer 420, including a processing unit 421, a memory 422, and a system bus 423 that couples various system components including the system memory to the processing unit 421. The processing unit may be any of various commercially available processors. Dual microprocessors and other multi-processor architectures also can be used as the processing unit 421. The system bus may be any of several types of bus structure including a memory bus or memory controller, a peripheral bus, and a local bus using any of a variety of conventional bus architectures. The memory 422 can include read only memory (ROM) 424, random access memory (RAM) 425, and nonvolatile storage media 426. A basic input/output system (BIOS), containing the basic routines that help to transfer information between elements within the server computer 420, such as during start-up, is stored in ROM 424.

A number of program modules may be stored in the memory 422, including an operating system 435, one or more application programs 436, other program modules 437, and program data 438. A user may enter commands and information into the server computer 420 through a keyboard 440 and a pointing device, such as a mouse 442. The input devices are often connected to the processing unit 421 through a serial port interface 446 that is coupled to the system bus, but may be connected by other interfaces, such as a parallel port, a game port or a universal serial bus (USB). A monitor 447 or other type of display device can be connected to the system bus 423 via an interface, such as a video adapter 448.

In accordance with the practices of persons skilled in the art of computer programming, the present invention has been described with reference to acts and symbolic representations of operations that are performed by a computer, such as the computer 420, unless otherwise indicated. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory 422 to thereby reconfigure or otherwise alter the computer system's operation, as well as other processing of signals. The memory locations where such data bits are maintained are physical locations that have particular electrical, magnetic, or optical properties corresponding to the data bits.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system that analyzes a series of images comprising:
   a contour initializer that establishes a plurality of initial contours from respective images within the series of images;

a model initializer that interconnects the plurality of initial contours into a surface model; and a model refiner that refines the plurality of initial contours by manipulating the surface model.

2. The system of claim 1, the surface model extending in at least one associated temporal dimension.

3. The system of claim 1, the surface model comprising a plurality of vertices each associated with one of the plurality of initial contours.

4. The system of claim 3, the model refiner comprising a surface deformer that changes the relative locations of the plurality of vertices within their associated contours.

5. The system of claim 3, the model refiner comprising a force calculator that calculates at least one virtual force to be applied to each vertex.

6. The system of claim 5, the at least one virtual force comprising an external force that attracts a given vertex toward desired features within its associated image.

7. The system of claim 5, the at least one virtual force comprising an internal force that acts to maintain a smooth and continuous curvature across a surface represented by the surface model.

8. The system of claim 5, the at least one virtual force comprising an a priori force that attracts a given vertex toward an a priori statistical estimate of its associated contour.

9. The system of claim 8, the a priori statistical estimate being derived from an expected shape of an imaged object associated with the series of images.

10. The system of claim 8, the a priori statistical estimate being derived from known characteristics of an imaging technique utilized to acquire the series of images.

11. The system of claim 1, further comprising an image acquisition device that acquires at least one of the series of images.

12. The system of claim 11, the image acquisition device comprising an ultrasound transducer.

13. The system of claim 1, further comprising a parameter calculator that determines at least one parameter from the refined image contours and associated image data.

14. The system of claim 1, the system comprising an ultrasound imaging system.

15. The system of claim 1, the system comprising one of a positron emission tomography imaging system, a single photon emission computed tomography system, an X-ray computed tomography system, a magnetic resonance imaging (MRI) system, and an X-ray fluoropscopy system.

16. The system of claim 1, the system comprising a nuclear-medicine imaging system.

17. A computer program product, located on a computer readable medium and operative in a data processing system, for analyzing N-dimensional data, where N is an integer greater than one, comprising:

a contour initializer that determines a plurality of initial contours, a given contour representing an data set having a dimensionality equal to N−1;

a model initializer that interconnects the initial contours into an initial N-dimensional surface model; and a model refiner that deforms the initial surface model as to optimize the plurality of initial contours.

18. The computer program product of claim 17, further comprising a parameter calculator that calculates at least one parameter from the refined contours.

19. The computer program product of claim 17, the model refiner deforming the model according to a priori statistical estimates of the plurality of contours.

20. The computer program product of claim 17, a given (N−1)-dimensional data set representing an image, and an $N^{th}$ dimension associated with the surface model representing the progression of time.

* * * * *